(12) United States Patent
Cayssials et al.

(10) Patent No.: US 11,547,884 B2
(45) Date of Patent: Jan. 10, 2023

(54) ASSEMBLY FOR AN AIRCRAFT, THE ASSEMBLY INCLUDING A PYLON AND A TANK CONTAINING AN EXTINGUISHER FLUID

(71) Applicant: Airbus Operations SAS, Toulouse (FR)

(72) Inventors: Julien Cayssials, Toulouse (FR); Jean Geliot, Toulouse (FR); Adeline Soulie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 126 days.

(21) Appl. No.: 17/123,444

(22) Filed: Dec. 16, 2020

(65) Prior Publication Data

US 2021/0188457 A1 Jun. 24, 2021

(30) Foreign Application Priority Data

Dec. 18, 2019 (FR) ...................................... 1914773

(51) Int. Cl.
*A62C 35/13* (2006.01)
*A62C 3/08* (2006.01)
*A62C 35/08* (2006.01)
*B64D 29/02* (2006.01)

(52) U.S. Cl.
CPC ................ *A62C 35/13* (2013.01); *A62C 3/08* (2013.01); *A62C 35/08* (2013.01); *B64D 29/02* (2013.01)

(58) Field of Classification Search
CPC ........... A62C 35/13; A62C 3/08; A62C 35/08; B64D 29/02; B64D 2045/009

USPC ..................................................... 169/28, 62
See application file for complete search history.

(56) References Cited

U.S. PATENT DOCUMENTS

2020/0298036 A1   9/2020   Partridge et al.

FOREIGN PATENT DOCUMENTS

| EP | 0383368 A2 | 8/1990 |
| FR | 3022219 A1 | 12/2015 |
| WO | 2019087147 A1 | 5/2019 |

OTHER PUBLICATIONS

French Search Report; priority document.

*Primary Examiner* — Christopher S Kim
(74) *Attorney, Agent, or Firm* — Greer, Burns & Crain Ltd.

(57) ABSTRACT

An assembly for an aircraft, the assembly including a pylon with a lateral wall pierced by a window, a tank with a neck blocked by a film and carrying a first anchoring arrangement, and a fixing arrangement for fixing at least a part of the tank bearing the neck inside the pylon, a discharge pipe, and a discharge head. The head includes an explosive cartridge and a hole with a second anchoring arrangement in which discharges the discharge pipe. The discharge head is fixed inside the pylon facing the window. The explosive cartridge is designed to generate in the hole a shockwave sufficient to rupture the film. An assembly of this kind enables simple and rapid removal of the tank from and installation thereof inside the pylon.

5 Claims, 2 Drawing Sheets

ASSEMBLY FOR AN AIRCRAFT, THE ASSEMBLY INCLUDING A PYLON AND A TANK CONTAINING AN EXTINGUISHER FLUID

CROSS-REFERENCES TO RELATED APPLICATIONS

This application claims the benefit of the French patent application No. 1914773 filed on Dec. 18, 2019, the entire disclosures of which are incorporated herein by way of reference.

FIELD OF THE INVENTION

The present invention concerns an assembly for an aircraft, the assembly including a pylon and a tank containing an extinguisher fluid, as well as an aircraft including at least one such assembly.

BACKGROUND OF THE INVENTION

An aircraft classically includes at least one nacelle in the interior of which is disposed an engine, for example of the turbojet type. The nacelle and the engine are fixed to the structure of the aircraft by means of a pylon fixed under the wing of the aircraft.

In order to prevent damage to the structure of the aircraft if the engine catches fire, the aircraft is equipped with an anti-fire system that includes two tanks.

FIG. 4 shows a prior art assembly 550 that includes a pylon 500 and two tanks 502 that are installed in the pylon 500 and each of which contains an extinguisher fluid. Each tank 502 is spherical and the pylon 500 includes, for each tank 502, a window 504 that passes through a lateral wall of the pylon 500 and through which the tank 502 is introduced and fixed inside the pylon 500.

Each tank 502 is equipped with a discharge head 506 that includes a film that closes the tank 502 and an explosive cartridge that destroys the film when it is activated. The anti-fire system also includes, for each tank 502, a discharge pipe 508 that extends inside the pylon 500 between the discharge head 506 and the engine.

The destruction of the film enables release of the extinguisher fluid which then flows in the discharge pipe 508.

If a tank 502 has to be demounted, it is necessary to disconnect the discharge head 506 and to detach the tank 502 from the pylon 500. This procedure is relatively lengthy and complicated because of the reduced space around the pylon 500.

It is therefore necessary to find a different installation that facilitates installing and removing the tank.

SUMMARY OF THE INVENTION

An object of the present invention is to propose an assembly for an aircraft where the assembly includes a pylon and at least one tank containing an extinguisher fluid and where the installation of the tank in the pylon is simple and rapid.

To this end there is proposed an assembly for an aircraft, the assembly including:
  a pylon including a lateral wall pierced by a window,
  a tank including a neck blocked by a film and carrying a first anchoring arrangement, and a fixing arrangement for fixing at least a part of the tank bearing the neck inside the pylon,
  a discharge pipe, and
  a discharge head including an explosive cartridge and a hole, the axis of the hole being parallel to a direction of introduction of the tank into the window, in which discharges the discharge pipe, where the discharge head carries around the hole a second anchoring arrangement, and where the discharge head is fixed inside the pylon in such a manner that the hole faces the window, where, in a position of use, the first anchoring arrangement and the second anchoring arrangement cooperate to fit the neck into the hole, and where the explosive cartridge is designed, when it is activated, to generate in the hole a shockwave sufficient to rupture the film.

This kind of assembly enables simple and rapid removal and installation of the tank inside the pylon.

The assembly advantageously includes rails fixed inside the pylon, extending parallel to the direction of introduction and disposed in line with the lower edge of the window and the tank advantageously includes a disk portion coaxial with the neck and the exterior edge of which is placed on the rails.

The assembly advantageously includes a flange fastened to the tank, the axis of the flange is advantageously parallel to the direction of introduction, and the flange is advantageously disposed on the opposite side to the neck in such a manner that when the tank is in the operating position the flange is pressed against the lateral wall and blocks the window.

The tank advantageously takes the form of an elongate ellipsoid with three half-axes, where the dimension of the tank along a first half-axis is different from the dimension of the tank along at least one other half-axis, where a half-major-axis extends parallel to the direction of introduction.

The invention also proposes an aircraft including an assembly in accordance with any one of the preceding variants.

BRIEF DESCRIPTION OF THE DRAWINGS

The abovementioned features of the invention and others will become more clearly apparent on reading the following description of one embodiment, the description being given with reference to the appended drawings, in which.

DETAILED DESCRIPTION OF THE PREFERRED EMBODIMENTS

Figure 1:
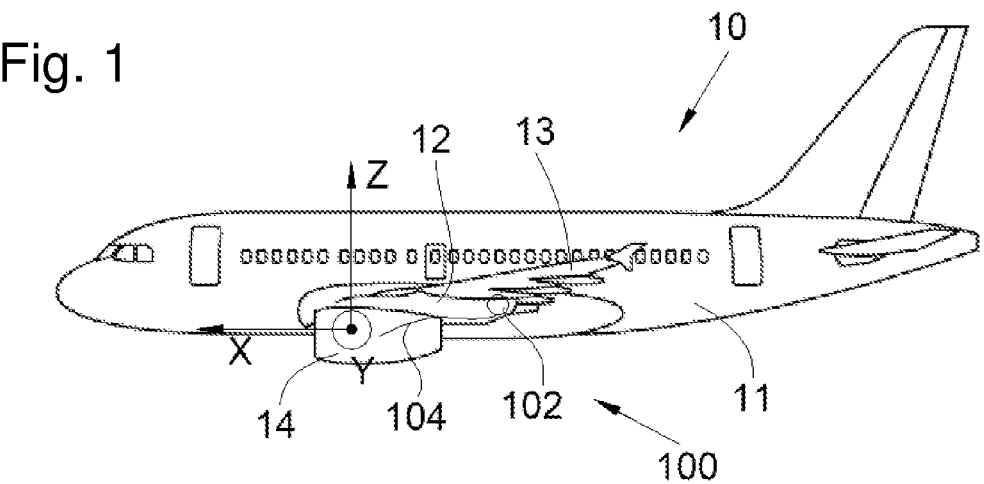
FIG. 1 is a side view of an aircraft in accordance with the invention.

In the following description, terms relating to a position refer to an aircraft in a normal flight position, that is to say, as represented in FIG. 1.

In the following description, and by convention, the longitudinal direction of the turbojet which is parallel to the longitudinal axis of the aircraft is named X, the transverse direction which is horizontal when the aircraft is on the ground is named Y, and the vertical direction which is vertical when the aircraft is on the ground is named Z, these three directions X, Y and Z being mutually orthogonal.

FIG. 1 shows an aircraft 10 that includes a fuselage 11, to each side of which is fixed a wing 13 that carries an engine 14 such as, for example, a turbofan engine.

The aircraft 10 also includes, for each engine 14, a pylon 12 that fixes the engine 14 under the wing 13.

The aircraft 10 includes, for each engine 14, an anti-fire system 100 that includes at least one tank 102 and a discharge pipe 104 for each tank 102 that extends between the tank 102 and the engine 14 supported by the pylon 12.

Figure 2:
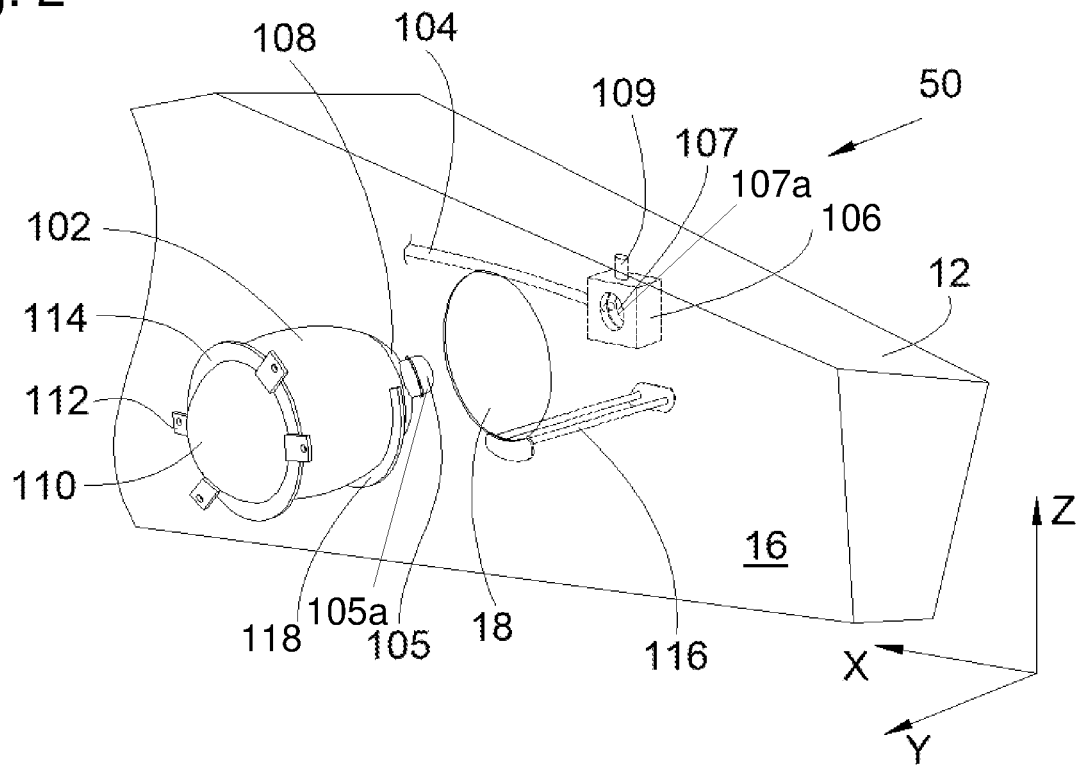
FIG. 2 is a perspective view of an assembly in accordance with the invention with the tank demounted.
Figure 3:
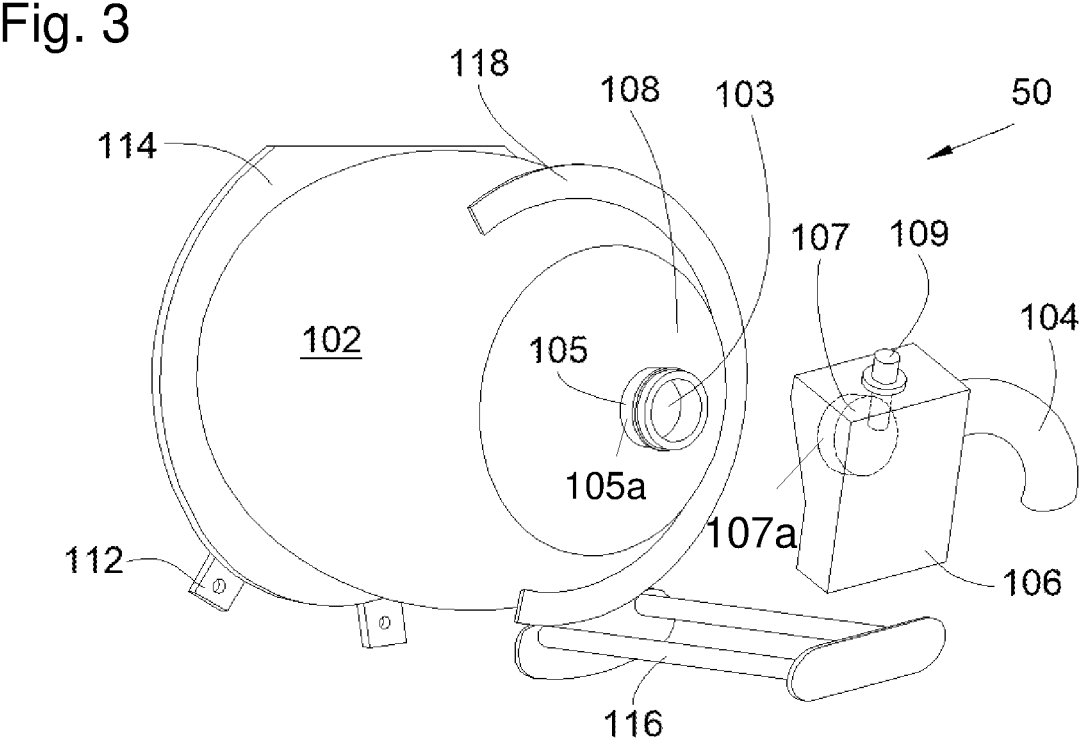
FIG. 3 is a perspective view of the assembly also with the tank demounted.
Figure 4:
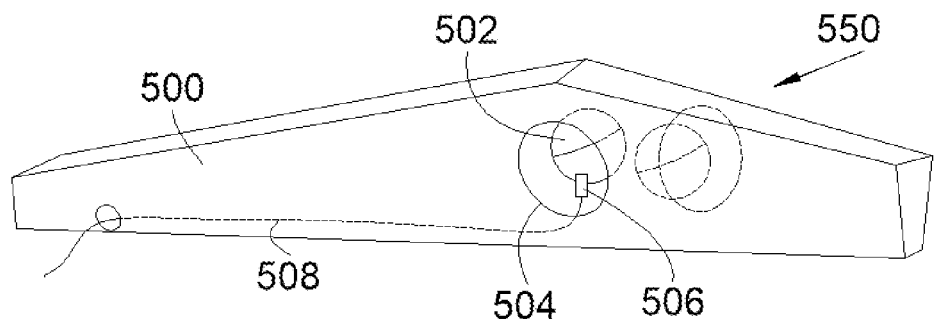
FIG. 4 is a perspective view of a prior art assembly.

FIG. 2 and FIG. 3 show an assembly 50 that includes the pylon 12, the tank 102 and the discharge pipe 104.

The tank 102 is filled with an extinguisher fluid and includes a neck 105 blocked by a film 103 that closes the tank 102 and where the neck 105 carries a first anchoring arrangement 105a.

The assembly 50 also includes a discharge head 106 to which the discharge pipe 104 is fluidically connected. The discharge head 106 is fixed inside the pylon 12 by any appropriate such as screws, for example. The discharge head 106 includes a hole 107 in which the discharge pipe 104 discharges and the discharge head 106 carries a second anchoring arrangement 107a around the hole 107.

The second anchoring arrangement 107a around the hole 107 and the first anchoring arrangement 105a on the neck 105 are configured to cooperate with one another to fix the neck 105 to the discharge head inside the hole 107. In accordance with one particular embodiment, the anchoring arrangements take the form of a quarter-turn bayonet or screw-type fixing and the tank 102 is installed on the discharge head 106 by rotation of the neck 105 in the hole 107 and conversely the tank 102 is removed by a reverse rotation of the neck 105.

The discharge head 106 also includes an explosive cartridge 109 that is designed, when it is activated, to generate in the hole 107 a shockwave sufficient to rupture the film 103 that is housed therein and thus to release the extinguisher fluid contained in the tank 102 in order for the extinguisher fluid to flow into the discharge pipe 104. In accordance with one particular embodiment, the explosive cartridge 109 is disposed in part inside the hole 107.

The pylon 12 classically extends in a longitudinal direction and has two lateral walls 16, namely a port lateral wall 16 and a starboard lateral wall.

The lateral wall 16, here the port wall, is pierced by a window 18 that enables access inside the pylon 12 and here is circular.

The discharge head 106 is disposed in such a manner that when the tank 102 is introduced via the window 18 the hole 107 faces the window 18; when the tank 102 is introduced, the neck 105 is therefore aligned with the hole 107.

The tank 102 has a first end 108 that bears the neck 105 and a second end 110 symmetrical with respect to the first end 108 (less the neck).

The tank 102 is equipped with a fixing arrangement 112 that here are disposed on the side of the second end 110. Here the fixing arrangement 112 comprises lugs with bolts that are screwed into the lateral panel 16 through the lugs. The fixing arrangement 112 fixes at least a part of the tank 102 inside the pylon 12 when the tank 102 is in the operating position, in particular, the part bearing the neck 105.

Installing the tank 102 comprises introducing the first end 108 into the window 18 parallel to a direction of introduction that is substantially parallel to the axis of the hole 107 until the neck 105 reaches the hole 107. Depending on the anchoring arrangement provided, the tank 102 is then moved to lock the first anchoring arrangement 105a with the second anchoring arrangement 107a, in particular here, by rotation to screw the neck 105 into the hole 107 and thus to lock the fixing arrangement 112. The tank 102 is then in the operating position and connected to the discharge pipe 104 via the discharge head 106. Here, the direction of introduction is globally parallel to the transverse direction Y.

The tank 102 is removed in the reverse manner by unlocking the fixing arrangement 112, here by unscrewing the neck 105 and then removing the tank 102.

Thus, the installation and removal of the tank 102 are effected in a simple and rapid manner, since it is not necessary to demount either the discharge pipe 104 or the discharge head 106.

To facilitate placing the tank 102 in the operating position in the pylon 12, the assembly 50 includes rails 116 that are fixed inside the pylon 12 and extend parallel to the direction of introduction. The rails 116 are disposed in line with the lower edge of the window 18. The rails 116 are, for example, fixed to the box section of the pylon 12.

At the level of the first end 108, the tank 102 includes a disk portion 118 that is fixed around the first end 108 and the exterior edge of which is placed on the rails 116 when the first end 108 is introduced into the window 18. The disk portion 118 then slides in translation on the rails 116 as the tank 102 is pushed inside the pylon 12. The angular extent of the disk portion 118 is such that when the tank 102, and therefore the disk portion 118, are rotated, the exterior edge of the disk portion 118 slides in rotation on the rails 116. The disk portion 118 is coaxial with the neck 105.

To close the window 18, when the tank 102 is in the operating position, the assembly 50 includes a flange 114 fastened to the tank 102. The flange 114 takes the form of a ring, the axis of which is parallel to the direction of introduction, and the flange 114 is disposed on the side of the second end 110 so that when the tank 102 is in the operating position, the flange 114 bears against the lateral wall 16 and blocks the window 18.

In the embodiment of the invention shown in FIGS. 2 and 3, the lugs of the fixing arrangement 112 are fixed to the flange 114.

In the embodiment of the invention described here, when the tank 102 is in place through the window 18, the first end 108 is housed in the pylon 12 and the second end 110 is outside the pylon 12.

In accordance with one particular embodiment, the tank 102 has a non-spherical shape and an elongate shape of ellipsoid or ovoid type.

The tank preferably takes the form of an elongate ellipsoid with three half-axes, namely the half-major-axis, the half-mean-axis and the half-minor-axis, where the dimension of the tank along a first half-axis is different from the dimension of the tank along at least one other half-axis.

The half-major-axis extends parallel to the direction of introduction and here extends parallel to the transverse direction Y, the half-mean-axis extends parallel to the vertical direction Z and the half-minor-axis extends parallel to the longitudinal direction X.

In the embodiment of the invention shown in FIGS. 2 and 3, the dimension of the tank 102 along the half-mean-axis and the dimension of the tank 102 along the half-minor-axis are equal, and the tank 102 is the shape of a rugby ball.

This elongate ellipsoid shape makes it possible for the tank 102 to have a greater volume without increasing the maximum diameter of the tank.

The installation of this kind of tank 102 enables a greater volume of the extinguisher fluid without having to increase the diameter of the window 18 and therefore without risk to the structure of the pylon 12.

In the embodiment of the invention described hereinabove there is only one tank 102 per pylon 12, but there are preferably at least two tanks 102 per pylon 12. The invention then applies in the same manner to each tank 102 and, in this case, there is a window 18 in each lateral wall 16, namely in the port lateral wall and the starboard lateral wall, and one tank 102 per window 18.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly including:
   a pylon including a lateral wall pierced by a window,
   a tank including a neck blocked by a film and carrying a first anchoring arrangement, and a fixing arrangement to fix at least a part of the tank bearing the neck inside the pylon,
   a discharge pipe, and
   a discharge head including an explosive cartridge and a hole, an axis of the hole being parallel to a direction of introduction of the tank into the window,
      the discharge pipe in communication with the hole,
      the discharge head carrying, around the hole, a second anchoring arrangement,
      the discharge head being fixed inside the pylon such that the hole faces the window,
      in a position of use, the first anchoring arrangement and the second anchoring arrangement cooperate to fit the neck into the hole, and
      the explosive cartridge being configured, when it is activated, to generate in the hole a shockwave sufficient to rupture the film.

2. The assembly according to claim 1,
   wherein the assembly includes rails fixed inside the pylon, extending parallel to the direction of introduction and disposed in line with a lower edge of the window, and
   wherein the tank includes a disk portion coaxial with the neck and an exterior edge of the disk portion being placed on the rails.

3. The assembly according to claim 1,
   wherein the assembly includes a flange fastened to the tank,
   wherein the axis of the flange is parallel to the direction of introduction, and
   wherein the flange is disposed on the opposite side to the neck such that when the tank is in the operating position, the flange is pressed against the lateral wall and blocks the window.

4. The assembly according to claim 1, wherein the tank is formed as an elongate ellipsoid with a first half axis, a second half axis, and a third half axes, where a dimension of the tank along the first half-axis is different from a dimension of the tank along at least one of the second half axis and the third half axis, where one of the first half axis, the second half axis, and the third half axis comprises a half-major axis that extends parallel to the direction of introduction.

5. An aircraft including an assembly according to claim 1.

* * * * *